(12) United States Patent
Ferreira et al.

(10) Patent No.: US 8,440,310 B2
(45) Date of Patent: May 14, 2013

(54) COATED ARTICLE WITH LOW-E COATING HAVING ZINC STANNATE BASED LAYER BETWEEN IR REFLECTING LAYERS FOR REDUCED MOTTLING AND CORRESPONDING METHODS

(71) Applicant: Guardian Industries Corp., Auburn Hills, MI (US)

(72) Inventors: Jose Ferreira, Rumelange (LU); Pierrot Pallotta, Villerupt (FR); Richard Blacker, Farmington Hills, MI (US); Muhammad Imran, Brownstown, MI (US)

(73) Assignees: Centre Luxembourgeois de Recherches pour le Verre et la Ceramique S.A. (C.R.V.C), Luxembourg (LU); Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 13/623,324

(22) Filed: Sep. 20, 2012

(65) Prior Publication Data
US 2013/0020827 A1 Jan. 24, 2013

Related U.S. Application Data

(62) Division of application No. 12/453,836, filed on May 22, 2009, now Pat. No. 8,281,617.

(51) Int. Cl.
*B32B 17/06* (2006.01)

(52) U.S. Cl.
USPC ........... 428/432; 428/428; 428/433; 428/434; 428/697; 428/698; 428/699; 428/701; 428/702; 428/704

(58) Field of Classification Search .................. None
See application file for complete search history.

(56) References Cited

U.S. PATENT DOCUMENTS

| | | | |
|---|---|---|---|
| 4,806,220 | A | 2/1989 | Finley |
| 4,898,789 | A | 2/1990 | Finley |
| 5,110,662 | A | 5/1992 | Depauw et al. |
| 5,270,517 | A | 12/1993 | Finley |

(Continued)

FOREIGN PATENT DOCUMENTS

| | | |
|---|---|---|
| FR | 2 898 122 | 9/2007 |
| WO | WO 2007/110552 | 10/2007 |

OTHER PUBLICATIONS

U.S. Appl. No. 12/453,836, filed May 22, 2009; Ferreira et al.
International Search Report dated Feb. 3, 2011.

*Primary Examiner* — Christina Johnson
*Assistant Examiner* — Lisa Herring
(74) *Attorney, Agent, or Firm* — Nixon & Vanderhye P.C.

(57) ABSTRACT

A coated article is provided which may be heat treated (e.g., thermally tempered) and/or heat bent in certain example instances. In certain example embodiments, a zinc stannate based layer is provided between a tin oxide based layer and a silicon nitride based layer, and this has been found to significantly reduce undesirable mottling damage upon heat treatment/bending. This results in significantly improved bendability of the coated article in applications such as vehicle windshields and the like.

10 Claims, 2 Drawing Sheets

U.S. PATENT DOCUMENTS

| | | | |
|---|---|---|---|
| 5,557,462 A | 9/1996 | Hartig et al. | |
| 5,688,585 A | 11/1997 | Lingle et al. | |
| 5,718,980 A | 2/1998 | Koch et al. | |
| 5,821,001 A | 10/1998 | Arbab et al. | |
| 6,045,896 A | 4/2000 | Boire et al. | |
| 6,090,481 A | 7/2000 | Depauw et al. | |
| 6,287,675 B1 | 9/2001 | Guiselin et al. | |
| 6,322,881 B1 | 11/2001 | Boire et al. | |
| 6,445,503 B1 | 9/2002 | Lingle | |
| 6,524,688 B1 | 2/2003 | Eby et al. | |
| 6,572,940 B1 | 6/2003 | Noethe et al. | |
| 6,576,349 B2 | 6/2003 | Lingle et al. | |
| 6,625,875 B2 | 9/2003 | Sol | |
| 6,632,491 B1 | 10/2003 | Thomsen et al. | |
| 6,686,050 B2 | 2/2004 | Lingle et al. | |
| 6,833,194 B1 * | 12/2004 | O'Shaughnessy | 428/432 |
| 7,060,359 B2 | 6/2006 | Eby et al. | |
| 7,150,916 B2 | 12/2006 | Lemmer et al. | |
| 7,217,460 B2 | 5/2007 | Nunez-Regueiro | |
| 7,344,782 B2 | 3/2008 | Lingle et al. | |
| 7,462,397 B2 | 12/2008 | Lingle et al. | |
| 7,521,096 B2 | 4/2009 | Lemmer et al. | |
| 8,281,617 B2 | 10/2012 | Ferreira et al. | |
| 2002/0064662 A1 | 5/2002 | Lingle et al. | |
| 2003/0150711 A1 | 8/2003 | Laird | |
| 2004/0000168 A1 | 1/2004 | Vandal | |
| 2004/0005467 A1 | 1/2004 | Neuman et al. | |
| 2009/0258222 A1 | 10/2009 | Roquiny et al. | |

* cited by examiner

COATED ARTICLE WITH LOW-E COATING HAVING ZINC STANNATE BASED LAYER BETWEEN IR REFLECTING LAYERS FOR REDUCED MOTTLING AND CORRESPONDING METHODS

This application is a divisional of application Ser. No. 12/453,836 filed May 22, 2009, the entire disclosure of which is hereby incorporated herein by reference in this application.

This invention relates to a coated article including a low-E coating. In certain example embodiments, the coated article may be heat treated (e.g., thermally tempered, heat bent and/or heat strengthened). In certain example embodiments of this invention, the coated article includes a zinc stannate based layer provided over a tin oxide based layer, in a central portion of the layer stack between first and second IR reflecting layers (e.g., Ag based layers). In certain example embodiments, the zinc stannate based layer is provided between and contacting the tin oxide based layer and a silicon nitride and/or silicon oxynitride based layer, so that the layer stack between the IR reflecting layers moving away from the glass substrate comprises layers comprising the following materials: glass . . . Ag . . . SnO/ZnSnO/SiN . . . Ag . . . . It has surprisingly been found that this layer stack portion significantly reduces mottling problems upon heat treatment, thereby resulting in a more durable coated article. Coated articles according to certain example embodiments of this invention may be used in the context of vehicle windshields (e.g., in laminated form), insulating glass (IG) window units, other types of windows, or in any other suitable application.

BACKGROUND OF THE INVENTION

Coated articles are known in the art for use in window application such as vehicle windshields, insulating glass (IG) window units, monolithic vehicle windows, and/or the like. It is known that in certain instances, it is desirable to heat treat (e.g., thermally temper, heat bend and/or heat strengthen) such coated articles for purposes of tempering, bending, or the like in certain example instances. For example, vehicle windshields are made up of a pair of glass substrates that are heat bent and laminated together via an adhesive layer (e.g., PVB based layer). One of the glass substrates may have a coating thereon which is subjected to the heat treatment along with the glass.

In certain situations, designers of coated articles often strive for a combination of high visible transmission, substantially neutral color, low emissivity (or emittance), and low sheet resistance ($R_s$). High visible transmission for example may permit coated articles to be more desirable in applications such as vehicle windshields or the like, whereas low-emissivity (low-E) and low sheet resistance characteristics permit such coated articles to block significant amounts of IR radiation so as to reduce for example undesirable heating of vehicle or building interiors.

In applications such as vehicle windshields requiring a visible transmission of at least 70%, or even at least 75%, the coated article must be bent as well as heat treated. The bending is often performed by allowing a coated glass article to sag while being heat treated in a known manner. The heat treatment of such coated articles typically requires the use of temperature(s) of at least 580 degrees C., more preferably of at least about 600 degrees C. and often at least 620 degrees C., for about 5-10 minutes or more.

Unfortunately, too much bending with heat treating in making windshields often causes such coated articles to suffer damage known as mottling. Mottling defects essentially result hum cracking of the coating. Mottling appears in a windshield during the bending process, and is observed after the bending process is complete. It is detected as an optical distortion, similar to a vertical "crack" in the windshield. Mottling defects in windshields are often roughly 5 mm long and roughly 100 μm wide, and several microns deep in certain example instances. With certain coated articles, mottling occurs when the coated article is heat bent to a significant extent. It is believed that the mottling damage results from high degrees of bending during heat treatment.

FIG. 1 is provided for the purpose of explaining the degree of bending of a coated glass article such as a vehicle windshield. FIG. 1 is a cross sectional view of a bent vehicle windshield. Parameter "x" in FIG. 1 represents the amount of bend in the windshield, and is known as a centerline convex value. The centerline convex value x is the distance between the apex of the interior surface of the windshield drawn straight down to a line (see the dotted line in FIG. 1) connecting the two ends of the windshield. This centerline convex value x is representative of the amount of bend (or depth of bend) in the windshield; the higher the value x, the higher the amount of bend in the windshield. FIG. 2 is a cross sectional view of a heat bent vehicle windshield (e.g., of FIG. 1, or an embodiment herein) which includes first and second heat bent glass substrates 1, 40 laminated to one another via a polymer inclusive layer (e.g., of or including PVB or any other suitable polymer inclusive material) 42, where the low-E (low emissivity) coating 30 is provided on one of the substrates. While many known windshields are capable of withstanding bends of about 18 mm (i.e., a centerline convex value x of about 18 mm), they often cannot withstand bending to a greater extent without suffering from fatal mottling damage.

Consider the following coated article with the below-listed layer stack, where the layers are listed in order from the glass substrate outwardly.

| Glass Substrate |
| --- |
| $TiO_2$ |
| $Si_3N_4$ |
| ZnO |
| Ag |
| $NiCrO_x$ |
| $SnO_2$ |
| $Si_3N_4$ |
| ZnO |
| Ag |
| $NiCrO_x$ |
| $SnO_2$ |
| $Si_3N_4$ |

While the aforesaid coated article is heat treatable, it cannot withstand significant degrees of heat bending without suffering fatal mottling damage. For example, such a coated article suffers fatal mottling damage at centerline convex values x of about 22-23 mm or more (i.e., a bend about 22-23 mm or more deep).

It will be appreciated by those skilled in the art that there sometimes exists a need for a vehicle windshield which is bent to a significant extent (e.g., bent to a centerline convex value x of at least about 24 mm, sometimes at least about 26 mm, or at least 28 mm, or even at least 30 or 32 mm in certain situations). Unfortunately, the coated article discussed above cannot be used in such applications because it cannot withstand such high degrees of bending without suffering fatal mottling damage.

Additionally, consider the following coated article with the below-listed layer stack, where the layers are listed in order from the glass substrate outwardly (thicknesses in angstroms).

Glass Substrate

| | |
|---|---|
| $Si_3N_4$ | 186 Å |
| $ZnAlO_x$ | 107 Å |
| Ag | 107 Å |
| $NiCrO_x$ | 30 Å |
| $SnO_2$ | 520 Å |
| $Si_3N_4$ | 131 Å |
| $ZnAlO_x$ | 119 Å |
| Ag | 103 Å |
| $NiCrO_x$ | 33 Å |
| $SnO_2$ | 120 Å |
| $Si_3N_4$ | 320 Å |

While the above coated article realizes satisfactory results in many instances, it too is subject to mottling in high bend (during HT) applications used in windshields. Again, it will be appreciated by those skilled in the art that there sometimes exists a need for a vehicle windshield which is bent to a significant extent (e.g., bent to a centerline convex value x of at least about 24 mm, sometimes at least about 26 mm, or at least 28 mm, or even at least 30 or 32 mm in certain situations). Unfortunately, the coated article discussed above cannot be used in such applications because it cannot withstand such high degrees of bending without suffering fatal mottling damage.

Moreover, in vehicle windshield or other applications such as in insulating glass (IG) window units, lengthy heat treatments at high temperatures tend to cause the aforesaid coated article to suffer significant drops in visible transmission, significant changes in certain color value(s), and significant increases in sheet resistance ($R_s$). Thus, there is room for improvement in one or more of these respects. Additionally, the aforesaid coated article is susceptible to scratching in certain instances, and is also sometimes characterized by high haze values following heat treatment in certain instances.

In view of the above, it will be apparent to those skilled in the art that there exists a need for coated articles which are capable of one or more of: (a) being bent to greater extents in applications such as vehicle windshields or the like, (b) being able to maintain acceptable optical characteristics when bent to such extents, (c) realizing improved or good thermal stability with regard to visible transmission, color, emissivity (or emittance), and/or sheet resistance ($R_s$); and/or (d) realizing good mechanical durability such as scratch resistance and reduced mottling. In certain example embodiments, it may be desired that one or more of these characteristics can be achieved.

BRIEF SUMMARY OF EXAMPLE EMBODIMENTS OF THE INVENTION

Certain example embodiments of this invention relate to a low-E coating. In certain example embodiments, the coated article may be heat treated (e.g., thermally tempered, heat bent and/or heat strengthened) in making a vehicle windshield or the like. In certain example embodiments of this invention, the low-E coating includes a zinc stannate based layer provided over a tin oxide based layer, in a central portion of the layer stack between first and second IR reflecting layers (e.g., Ag based layers). In certain example embodiments, the zinc stannate based layer is provided between and contacting the underlying tin oxide based layer and an overlying silicon nitride and/or silicon oxynitride based layer, so that the layer stack between the IR reflecting layers moving away from the glass substrate comprises layers comprising the following materials: glass . . . Ag . . . SnO/ZnSnO/SiN . . . Ag . . . . It has surprisingly been found that this layer stack significantly reduces mottling problems upon heat treatment, thereby resulting in a more durable coated article and/or a windshield that can be bent to a greater degree without suffering fatal mottling damage. Coated articles according to certain example embodiments of this invention may be used in the context of vehicle windshields (e.g., in laminated form), insulating glass (IG) window units, other types of windows, or in any other suitable application.

In certain example embodiments of this invention, coated articles with such a layer stack can be heat bent to a centerline convex value "x" of at least about 24 mm, more preferably at least about 26 mm, more preferably at least 28 mm, even more preferably at least 30 mm, still more preferably at least about 32 mm, more preferably at least about 34 mm, and sometimes at least about 36 mm, without suffering significant or fatal mottling damage.

In certain example embodiments of this invention, it is possible that such a layer stack comprising: glass . . . Ag . . . SnO/ZnSnO/SiN . . . Ag . . . , can improve mechanical durability in applications such as vehicle windshields and/or the like.

These surprisingly results, which in certain example instances are associated with the use of the combination layer stack portion of glass . . . Ag . . . SnO/ZnSnO/SiN . . . Ag . . . , are highly advantageous since reduction in mottling damage, bendability and/or improved scratch resistance are typically desired features in coated articles such as vehicle windows, IG window units, and/or the like.

In certain example embodiments of this invention, there is provided a method of making a vehicle windshield, the method comprising: having or providing a coating on a glass substrate, the coating comprising first and second layers comprising silver with at least the following layers therebetween moving away from the glass substrate: a contact layer over and contacting the first layer comprising silver, a layer comprising tin oxide over at least the contact layer, a layer comprising zinc stannate over and contacting the layer comprising tin oxide, a layer comprising silicon nitride over at least the layer comprising zinc stannate, and a layer comprising zinc oxide over at least the layer comprising silicon nitride; and heat bending the glass substrate with the coating thereon to an extent so as to have a centerline convex value "x" of at least about 28 mm without experiencing significant mottling damage due to the heat bending.

In other example embodiments of this invention, there is provided a coated article comprising a coating supported by a glass substrate, the coating comprising from the glass substrate outwardly: a layer comprising silicon nitride; a first layer comprising zinc oxide located over and contacting the layer comprising tin oxide; a first infrared (IR) reflecting layer located over and contacting the layer comprising zinc oxide; a layer comprising tin oxide located over the first IR reflecting layer; a layer comprising zinc stannate located over the layer comprising tin oxide; a layer comprising silicon nitride located over the layer comprising zinc stannate; a second IR reflecting layer located over the layer comprising silicon nitride; and at least another dielectric layer located over the second IR reflecting layer.

In still further example embodiments of this invention, there is provided a method of making a coated article, the method comprising: heat treating a glass substrate with a coating thereon, the coating comprising first and second layers comprising silver with at least a layer comprising zinc stannate therebetween, wherein the layer comprising zinc stannate is provided between at least a layer comprising tin oxide and a layer comprising silicon nitride, wherein the layer comprising zinc stannate is located over and contacting the layer comprising tin oxide; and heat bending the glass substrate with the coating thereon without experiencing significant mottling damage due to the heat bending.

DETAILED DESCRIPTION OF EXAMPLES OF THE INVENTION

Figure 1:
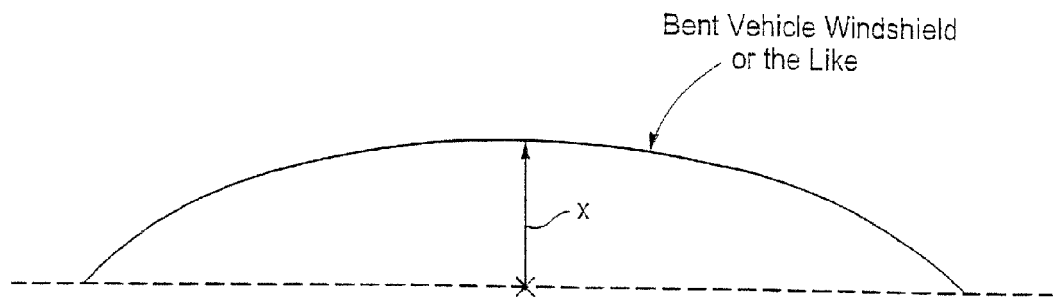
FIG. 1 is a schematic diagram illustrating the centerline convex value ("x") of a bent vehicle windshield or other bent coated article.

Coated articles herein may be used in applications such as bent vehicle windshields, other types of vehicle windows, and/or any other suitable application such as in an IG or monolithic window unit.

Certain example embodiments of this invention relate to a low-E coating 30 used in connection with a vehicle windshield or the like. In certain example embodiments, the coated article may be heat treated (e.g., thermally tempered, heat bent and/or heat strengthened) in making a vehicle windshield or the like. In certain example embodiments of this invention, the low-E coating 30 includes a zinc stannate based layer 14 provided over a tin oxide based layer 13, in a central portion of the layer stack between first and second IR reflecting layers 9 and 19 (e.g., see FIG. 3). In certain example embodiments, the zinc stannate based layer 14 is provided between and contacting the underlying tin oxide based layer 13 and an overlying silicon nitride and/or silicon oxynitride based layer 15, so that the layer stack between the IR reflecting layers 9 and 19 moving away from the glass substrate 1 comprises layers comprising the following materials: glass . . . Ag . . . SnO/ZnSnO/SiN . . . Ag . . . . It is noted that zinc stannate is a combination of zinc/tin oxide. It has surprisingly been found that this layer stack significantly reduces mottling problems upon heat treatment, thereby resulting in a more durable coated article and/or a windshield that can be bent to a greater degree without suffering fatal mottling damage. In other words, unexpectedly, it has been found that the use of such a zinc stannate based layer, between tin oxide and silicon nitride inclusive layers, results in significantly improved bendability of coated articles in applications such as vehicle windshields or the like. In particular, it has surprisingly been found that the provision of such a layer stack permits a coated article to be bent to a significantly greater extent without suffering significant or fatal mottling damage in certain example embodiments of this invention. Coated articles according to certain example embodiments of this invention may be used in the context of vehicle windshields (e.g., in laminated form), insulating glass (IG) window units, other types of windows, or in any other suitable application.

Figure 2:
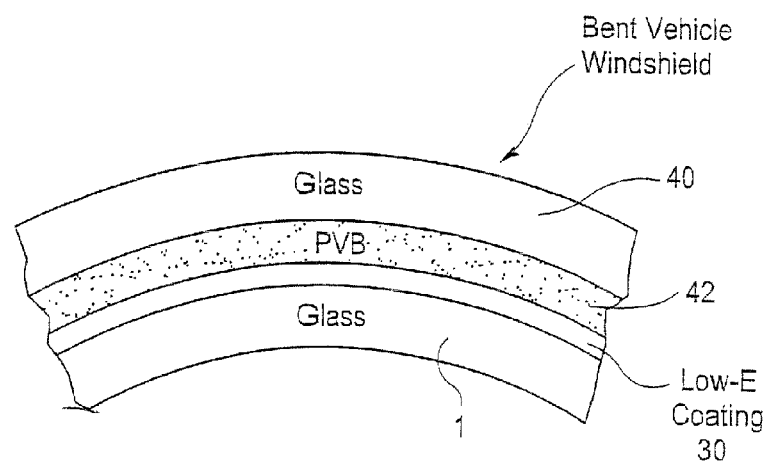
FIG. 2 is a cross sectional view of a bent vehicle windshield, of FIG. 1, or of a suitable embodiment of this invention.
Figure 3:
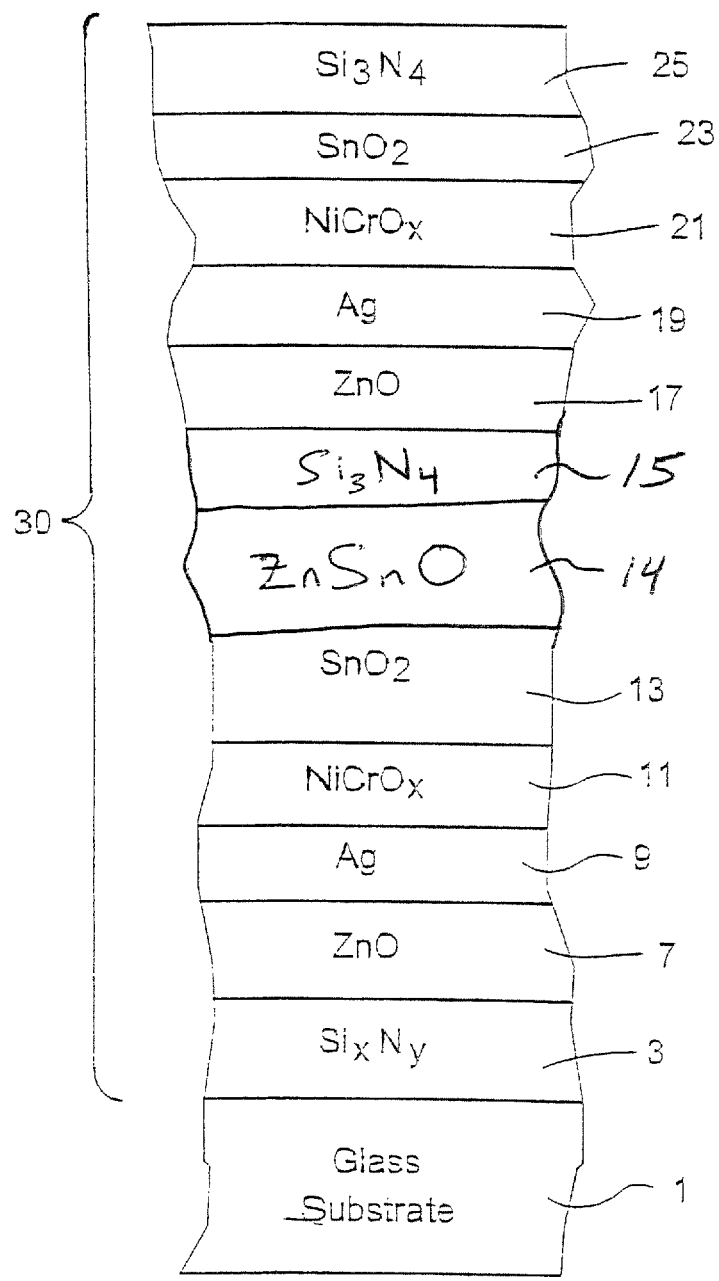
FIG. 3 is a cross sectional view of a coated article according to an example embodiment of this invention.

The second conventional coating shown above in the background section has a typical layer stack containing a layer of tin oxide as the main center dielectric. This layer is often deposited from two tin cathodes during a sputter-deposition process. This tin oxide undergoes a crystallization during heat treatment (e.g., as in tempering or windshield bending), which is associated with a significant change in stress of this layer moving from a strong compressive stress as deposited to a lesser or even tensile stress after heat treatment (HT). This stress change can occur very rapidly at certain temperatures during the heating cycle. In contrast, it has been found that the zinc stannate (ZnSnO) based layer 14 in certain example embodiments of this invention, between layers comprising tin oxide 13 and silicon nitride 15, does not undergo the same crystallization change upon heating/bending, and remains substantially amorphous after heating during the HT. There may be, however, a change of stress in the zinc stannate based layer with the heating, that is less rapid than is realized with the tin oxide layer. This change in stress occurs at a higher temperature for the zinc stannate based layer 14, than for the tin oxide layer in the conventional coating. For example, this change in stress can happen at about 400 degrees C. for the zinc stannate based layer 14, compared to at about 360 degrees C. for the central tin oxide dielectric layer in the conventional coating. Based on experimental results, it has been found that use of (a) glass . . . Ag . . . SnO/ZnSnO/SiN . . . Ag . . . according to certain embodiments of this invention, instead of the conventional (b) glass . . . Ag . . . SnO/SiN . . . Ag . . . , reduces the undesirable mottling effect. Moreover, the order of the zinc stannate (ZnSnO) based layer 14 being over top of the tin oxide based layer 13 has been found to be particularly important as well in reducing mottling, because reversing the order of these two layers has no or negative impact and mottling is still realized. When bent to the same bend degrees, windshields as shown in FIGS. 1-3 having the FIG. 3 coating show no or little mottling, whereas windshields having the coating shown in the background section do realize mottling.

In certain example embodiments of this invention, improved mechanical durability and/or reduced damage upon heat treatment can be realized when thermodynamically stable silver based layers 9, 19 are deposited, and the use of the layer comprising zinc stannate 14 between layers comprising tin oxide 13 and silicon nitride 15 is believed to aid in providing such silver based layers with stability during heat treatment and/or bending even though the zinc stannate need not be in direct contact with the silver in certain example embodiments of this invention. In other words, it has unexpectedly been found that by providing the layer comprising zinc stannate 14 between layers comprising tin oxide 13 and silicon nitride 15, significantly improved bendability can be achieved.

In certain example embodiments of this invention, coated articles with such a layer stack can be heat bent to a centerline convex value "x" of at least about 24 mm (e.g., see FIG. 1), more preferably at least about 26 mm, more preferably at least about 28 mm, even more preferably at least 30 mm, still more preferably at least about 32 mm, more preferably at least about 34 mm, and sometimes at least about 36 mm, without suffering significant or fatal mottling damage. In certain example embodiments of this invention, it is possible that the layer comprising zinc stannate 14 between layers comprising tin oxide 13 and silicon nitride 15 can also improve mechanical durability (e.g., scratch resistance) in applications such as vehicle windshields, IG window units, monolithic windows, and/or the like.

These surprisingly results, which in certain example instances are associated with the use of the combination layer stack portion of glass . . . Ag . . . SnO/ZnSnO/SiN . . . Ag . . . , are highly advantageous, since reduction in mottling damage, bendability and/or improved scratch resistance are typically desired features in coated articles such as vehicle windows, IG window units, and/or the like. In certain example embodiments, the dielectric zinc stannate (e.g., ZnSnO or the like) based layer 14 may include more Zn than Sn by weight. For example, the zinc stannate based layer 14 may include about 52% Zn and about 48% Sn (in addition to the oxygen) in certain example embodiments of this invention. Thus, for example, the zinc stannate based layer may be sputter-deposited using a metal target comprising about 52% Zn and about 48% Sn in certain example embodiments of this invention. Optionally, the zinc stannate based layer 14 may be doped with other metals such as Al or the like.

Optionally, the provision of an overcoat layer of or including zirconium oxide (not shown) or the like can reduce and/or eliminate such thermal stability problems. In particular, in certain example embodiments of this invention, the use of a zirconium oxide inclusive overcoat layer in combination with the glass . . . Ag . . . SnO/ZnSnO/SiN . . . Ag . . . can result in a coated article which does not suffer from significant thermal stability issues (e.g., the coated article can realize acceptable visible transmission, a* and/or b* values following heat treatment and bending).

Example advantages associated with certain example embodiments of this invention include a coated article which is capable of include one or more of: (a) being bent to greater extents in applications such as vehicle windshields or the like, (b) being able to maintain acceptable optical characteristics when bent to such extents, (c) reduced mottling damage upon heat treatment and bending, (d) realizing improved or good thermal stability with regard to visible transmission, color, emissivity (or emittance), and/or sheet resistance ($R_s$); (e) realizing improved mechanical durability. In certain example embodiments, one or more of these characteristics/advantages can be achieved.

In certain example embodiments of this invention, the coating includes a double-silver stack, although this invention is not so limited in all instances (e.g., three silver based layers can be used in certain instances). For example, in certain example embodiments of this invention, heat treated and/or heat bent coated articles having multiple IR reflecting layers (e.g., two spaced apart silver based layers) are capable of realizing a sheet resistance ($R_s$) of less than or equal to 3.0 (more preferably less than or equal to 2.5, even more preferably less than or equal to 2.1, and most preferably less than or equal to 2.0). In certain example embodiments, following heat treatment and as measured in monolithic and/or laminated form, coated articles herein are capable of realizing a visible transmission (Ill. C, 2 degree) of at least about 70%, more preferably of at least about 75%, and most preferably of at least about 76%.

The terms "heat treatment" and "heat treating" as used herein mean heating the article to a temperature sufficient to achieve thermal tempering, heat bending, and/or heat strengthening of the glass inclusive coated article. This definition includes, for example, heating a coated article in an oven or furnace at a temperature of least about 580 degrees C., more preferably at least about 600 degrees C., for a sufficient period to allow tempering, bending, and/or heat strengthening. In certain instances, the HT may be for at least about 4 or 5 minutes or more.

Bending may be performed in any suitable manner. For example, and without limitation, in forming a windshield including a pair of glass substrates, two flat glass substrates (at least one with a coating thereon) can be placed in a bending furnace (e.g., on a bending mold) in an overlapping manner by interposing an optional lubricating powder such as sodium hydrogen carbonate, cerite, magnesium oxide, silica, or the like between contacting surfaces of the two glass substrates. The glass substrates are then heated using infrared (IR) emitting heating elements to a processing temperature(s) near a softening point of the glass (e.g., from about 550 to 850 degrees C., more preferably from about 580 to 750 degrees C.) in order to soften the overlapping glass substrates. Upon softening, the glass substrates (including any solar control coating such as a low-E coating thereon) are bent by their deadweight (i.e., sagging) along a shaping surface of a bending mold (not shown) into the desired curved shape appropriate for the vehicle windshield being made. A press bending apparatus may optionally be used after the glass is sufficiently softened (e.g., press bending may be conducted as the final step before cooling the glass). After being heat bent in such a manner, the bent glass substrates (with solar control coating still on the bent substrate) are separated from one another and a polymer inclusive interlayer sheet (e.g., PVB) is interposed therebetween. The bent glass substrates are then laminated to one another via the polymer inclusive interlayer (e.g., PVB) in order to form the resulting vehicle windshield.

FIG. 3 is a side cross sectional view of a coated article according to an example non-limiting embodiment of this invention. The coated article includes substrate 1 (e.g., clear, green, bronze, or blue-green glass substrate from about 1.0 to 10.0 mm thick, more preferably from about 1.0 mm to 3.5 mm thick), and coating (or layer system) 30 provided on the substrate 1 either directly or indirectly. The coating (or layer system) 30 includes: bottom silicon nitride inclusive dielectric layer 3 which may be $Si_3N_4$, of the Si-rich type for haze reduction, or of any other suitable stoichiometry in different embodiments of this invention, first lower contact layer 7 (which contacts IR reflecting layer 9), first conductive and preferably metallic infrared (IR) reflecting layer 9, first upper contact layer 11 (which contacts layer 9), dielectric layer 13 (which may be deposited in one or multiple steps in different embodiments of this invention) of or including tin oxide, dielectric layer 14 comprising zinc stannate over and contacting the tin oxide based layer 13, another dielectric silicon nitride inclusive layer 15 which may or may not include some oxide, second lower contact layer 17 (which contacts IR reflecting layer 19), second conductive and preferably metallic IR reflecting layer 19, second upper contact layer 21 (which contacts layer 19), dielectric layer 23, and silicon nitride inclusive layer 25, and an finally optional protective dielectric layer of or including zirconium oxide or the like (not shown). The "contact" layers 7, 11, 17 and 21 each contact at least one IR reflecting layer (e.g., layer based on Ag). The aforesaid layers 2-25 make up low-E (i.e., low emissivity) coating 30 which is provided on glass or plastic substrate 1.

In monolithic instances, the coated article includes only one glass substrate 1 as illustrated in FIG. 1. However, monolithic coated articles herein may be used in devices such as laminated vehicle windshields, IG window units, and the like. As shown in FIG. 2, a laminated vehicle window such as a windshield typically includes first and second glass substrates 1 and 40 laminated to one another via a polymer based interlayer 42 (e.g., see U.S. Pat. No. 6,686,050, the disclosure of which is incorporated herein by reference). One or both of these substrates of the laminate may support low-E coating 30 on an interior surface thereof in certain example embodiments (either substrate may support the low-E coating 30, although the inner substrate supports the coating in the example shown in FIG. 2). As for IG window units, an IG window unit may include two spaced apart substrates. An example IG window unit is illustrated and described, for example, in U.S. Pat. No. 6,632,491, the disclosure of which is hereby incorporated herein by reference. An example IG window unit may include, for example, the coated glass substrate 1 shown in FIG. 3 coupled to another glass substrate via spacer(s), sealant(s) or the like with a gap being defined therebetween. This gap between the substrates in IG unit embodiments may in certain instances be filled with a gas such as argon (Ar).

Dielectric layers 3 and 15 may be of or include silicon nitride in certain embodiments of this invention. Silicon nitride layers 3 and 15 may, among other things, improve heat-treatability of the coated articles, e.g., such as thermal tempering or the like, and may or may not include some oxygen. The silicon nitride of layers 3 and/or 15 may be of the stoichiometric type (i.e., $Si_3N_4$), or alternatively of the Si-rich type in different embodiments of this invention. For example, Si-rich silicon nitride 3 (and/or 15) combined with zinc stannate 14 and/or tin oxide 13 under a silver based IR reflecting layer 19 may permit the silver to be deposited (e.g., via sputtering or the like) in a manner which causes its sheet resistance to be lessened compared to if certain other material(s) were under the silver. Moreover, the presence of free Si in a Si-rich silicon nitride inclusive layer 3 and/or 15 may allow certain atoms such as sodium (Na) which migrate outwardly from the glass 1 during heat treatment (HT) to be more efficiently stopped by the Si-rich silicon nitride inclusive layer before they can reach the silver and damage the same.

In certain example embodiments, when Si-rich silicon nitride is used in layer 3 and/or 15, the Si-rich silicon nitride layer as deposited may be characterized by $Si_xN_y$ layer(s), where x/y may be from 0.76 to 1.5, more preferably from 0.8 to 1.4, still more preferably from 0.85 to 1.2. Moreover, in certain example embodiments, before and/or after HT the Si-rich $Si_xN_y$ layer(s) may have an index of refraction "n" of at least 2.05, more preferably of at least 2.07, and sometimes at least 2.10 (e.g., 632 nm) (note: stoichiometric $Si_3N_4$ which may also be used has an index "n" of 2.02-2.04). In certain example embodiments, it has surprisingly been found that improved thermal stability is especially realizable when the Si-rich $Si_xN_y$ layer(s) as deposited has an index of refraction "n" of at least 2.10, more preferably of at least 2.20, and most preferably from 2.2 to 2.4. Also, the Si-rich $Si_xN_y$ layer in certain example embodiments may have an extinction coefficient "k" of at least 0.001, more preferably of at least 0.003 (note: stoichiometric $Si_3N_4$ has an extinction coefficient "k" of effectively 0). Again, in certain example embodiments, it has surprisingly been found that improved thermal stability can be realized when "k" for the Si-rich $Si_xN_y$ layer(s) is from 0.001 to 0.05 as deposited (550 nm). It is noted that n and k tend to drop due to heat treatment.

Any and/or all of the silicon nitride layers discussed herein may be doped with other materials such as stainless steel or aluminum in certain example embodiments of this invention. For example, any and/or all silicon nitride layers discussed herein may optionally include from about 0-15% aluminum, more preferably from about 1 to 10% aluminum, in certain example embodiments of this invention. The silicon nitride may be deposited by sputtering a target of Si or SiAl in an atmosphere including at least nitrogen gas in certain embodiments of this invention.

Infrared (IR) reflecting layers 9 and 19 are preferably substantially or entirely metallic and/or conductive, and may comprise or consist essentially of silver (Ag), gold, or any other suitable IR reflecting material. IR reflecting layers 9 and 19 help allow the coating to have low-E and/or good solar control characteristics. The IR reflecting layers may, however, be slightly oxidized in certain embodiments of this invention.

The upper contact layers 11 and 21 may be of or include nickel (Ni) oxide, chromium/chrome (Cr) oxide, or a nickel alloy oxide such as nickel chrome oxide ($NiCrO_x$), or other suitable material(s), in certain example embodiments of this invention. The use of, for example, $NiCrO_x$ in these layers (11 and/or 21) allows durability to be improved. The $NiCrO_x$ of layers 11 and/or 21 may be fully oxidized in certain embodiments of this invention (i.e., fully stoichiometric), or alternatively may only be partially oxidized (i.e., sub-oxide). In certain instances, the $NiCrO_x$ layers 11 and/or 21 may be at least about 50% oxidized. Contact layers 11 and/or 21 (e.g., of or including an oxide of Ni and/or Cr) may or may not be oxidation graded in different embodiments of this invention. Oxidation grading means that the degree of oxidation in the layer changes throughout the thickness of the layer. For example, a contact layer 11 and/or 21 may be graded so as to be less oxidized at the contact interface with the immediately adjacent IR reflecting layer than at a portion of the contact layer(s) further or more/most distant from the immediately adjacent IR reflecting layer. Descriptions of various types of oxidation graded contact layers are set forth in U.S. Pat. No. 6,576,349, the disclosure of which is hereby incorporated herein by reference. Contact layers 11 and/or 21 (e.g., of or including an oxide of Ni and/or Cr) may or may not be continuous in different embodiments of this invention across the entire underlying IR reflecting layer.

Dielectric layer 13 may be of or include tin oxide in certain example embodiments of this invention. However, it may be doped with certain other materials in other example embodiments, such as with Al or Zn in certain example alternative embodiments.

Lower contact layers 7 and/or 17 in certain embodiments of this invention are of or include zinc oxide (e.g., ZnO). The zinc oxide of layers 7 and/or 17 may contain other materials as well such as Al (e.g., to form $ZnAlO_x$). For example, in certain example embodiments of this invention, one or more of zinc oxide layers 7, 17 may be doped with from about 1 to 10% Al, more preferably from about 1 to 5% Al, and most preferably about 1 to 4% Al.

Zinc stannate based layer 14 is provided over and contacting layer 13 comprising tin oxide and under and possibly contacting layer 15 of or including silicon nitride, in a central portion of the layer stack between first and second IR reflecting layers 9 and 19. As mentioned above, it has surprisingly been found that this layer stack significantly reduces mottling problems upon heat treatment, thereby resulting in a more durable coated article and/or a windshield that can be bent to a greater degree without suffering fatal mottling damage. In other words, unexpectedly, it has been found that the use of such a zinc stannate based layer, between tin oxide and silicon nitride inclusive layers, results in significantly improved bendability of coated articles in applications such as vehicle windshields or the like. In certain alternative embodiments, it is possible to dope the zinc stannate based layer 14 and/or tin oxide based layer 13 with other materials such as Al, Zn, N, or the like.

Dielectric layer 23 may be of or include tin oxide in certain example embodiments of this invention. However, layer 23 is optional and need not be provided in certain example embodiments of this invention. Dielectric layer 25 may be of or include silicon nitride (e.g., $Si_3N_4$) or any other suitable material in certain example embodiments of this invention. Optionally, other layers may be provided above layer 25. Layer 25 is provided for durability purposes, and to protect the underlying layers during heat treatment and/or environmental use. In certain example embodiments, layer 25 may have an index of refraction (n) of from about 1.9 to 2.2, more preferably from about 1.95 to 2.05. Optionally, the provision of an overcoat layer of or including zirconium oxide (not shown) can reduce and/or eliminate certain thermal stability issues.

In certain example embodiments, it has been found that good optical properties are achieved when the total thickness of the combination of zinc stannate based layer 14 and tin oxide inclusive layer 13 is from about 430 to 650 Å, more preferably from about 460 to 600 Å, and most preferably from about 500 to 540 Å. In certain example embodiments, zinc stannate based layer 14 and tin oxide inclusive layer 13 have approximately the same thickness, and do not differ in thickness from each other by more than about 100 Å, more preferably by no more than about 60 or 30 Å. Each of layers 13 and 14 is thicker than silicon nitride based layer 15 in certain example embodiments of this invention, preferably by at least about 50 Å, more preferably by at least about 75 or 100 Å.

Other layer(s) below or above the illustrated coating may also be provided. Thus, while the layer system or coating is "on" or "supported by" substrate 1 (directly or indirectly), other layer(s) may be provided therebetween. Thus, for example, the coating of FIG. 3 may be considered "on" and "supported by" the substrate 1 even if other layer(s) are provided between layer 3 and substrate 1. Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention.

While various thicknesses and materials may be used in layers in different embodiments of this invention, example thicknesses and materials for the respective layers on the glass substrate 1 in the FIG. 3 embodiment are as follows, from the glass substrate outwardly:

Example Materials/Thicknesses; FIG. 3 Embodiment

| Layer<br>Glass (1-10 mm thick) | Preferred Range<br>(Å) | More Preferred<br>(Å) | Example (Å) |
|---|---|---|---|
| $Si_xN_y$ (layer 3) | 40-450 Å | 70-300 Å | 186 Å |
| $ZnAlO_x$ (layer 7) | 10-300 Å | 40-150 Å | 107 Å |
| Ag (layer 9) | 50-250 Å | 80-120 Å | 107 Å |
| $NiCrO_x$ (layer 11) | 10-100 Å | 12-40 Å | 30 Å |
| $SnO_2$ (layer 13) | 100-500 Å | 200-320 Å | 260 Å |
| ZnSnO (layer 14) | 100-500 Å | 200-320 Å | 260 Å |
| $Si_xN_y$ (layer 15) | 50-450 Å | 80-200 Å | 131 Å |
| $ZnAlO_x$ (layer 17) | 10-300 Å | 40-150 Å | 119 Å |
| Ag (layer 19) | 50-250 Å | 80-220 Å | 103 Å |
| $NiCrO_x$ (layer 21) | 10-100 Å | 20-45 Å | 33 Å |
| $SnO_2$ (layer 23) | 0-750 Å | 70-180 Å | 120 Å |
| $Si_3N_4$ (layer 25) | 10-750 Å | 190-400 Å | 320 Å |

In certain example embodiments of this invention, coated articles herein may have the following optical and solar characteristics when measured monolithically (before any optional HT). The sheet resistances ($R_s$) herein take into account all IR reflecting layers (e.g., silver layers 9, 19).

Optical/Solar Characteristics (Monolithic; pre-HT)

| Characteristic | General | More Preferred | Most Preferred |
|---|---|---|---|
| $R_s$ (ohms/sq.): | <=5.0 | <=4.0 | <=3.0 |
| $E_n$: | <=0.07 | <=0.04 | <=0.03 |
| $T_{vis}$ (Ill. C 2°): | >=70% | >=75% | >=77% |

In certain example embodiments, coated articles herein may have the following characteristics, measured monolithically for example, after heat treatment (HT):

Optical/Solar Characteristics (Monolithic; post-HT)

| Characteristic | General | More Preferred | Most Preferred |
|---|---|---|---|
| $R_s$ (ohms/sq.): | <=3.0 | <=2.5 | <=2.1 (or <=2.0) |
| $E_n$: | <=0.07 | <=0.04 | <=0.03 |
| $T_{vis}$ (Ill. C 2°): | >=75% | >=78% | >=80% |
| Transmitted Haze: | <=0.5 | <=0.4 | <=0.38 |

Moreover, in certain example laminated embodiments of this invention, coated articles herein which have been heat treated to an extent sufficient for tempering (and optionally heat bent), and which have been laminated (via index oil and/or a polymer inclusive interlayer) to another glass substrate may have the following optical/solar characteristics.

Example Optical Characteristics (Laminated: post-HT)

| Characteristic | General | More Preferred |
|---|---|---|
| $T_{vis}$ (or TY)(Ill. C 2°): | >=70% | >=75% |
| $a^*_t$ (Ill. C 2°): | −6 to +1.0 | −5 to 0.0 |
| $b^*_t$ (Ill. C 2°): | −2.0 to +8.0 | 0.0 to 6.0 |
| L* (Ill. C 2°): | 80-95 | 88-95 |
| $R_fY$ (Ill. C, 2 deg.): | 1 to 13% | 1 to 12% |
| $a^*_f$ (Ill. C, 2°): | −5.0 to +2.0 | −4.0 to +0.5 |
| $b^*_f$ (Ill. C, 2°): | −14.0 to +10.0 | −10.0 to +3.5 |
| L* (Ill. C 2°): | 30-45 | 33-41 |
| $R_gY$ (Ill. C, 2 deg.): | 1 to 12% | 1 to 10% |
| $a^*_g$ (Ill. C, 2°): | −5.0 to +3.0 | −2.5 to +2.5 |
| $b^*_g$ (Ill. C, 2°): | −20.0 to +10.0 | −15.0 to 0 |
| L* (Ill. C 2°): | 30-40 | 33-38 |
| Haze (transmissive): | <=0.6 | <=0.5 |

The following examples are provided for purposes of example only, and are not intended to be limiting unless specifically claimed.

EXAMPLES

The following Example was made via sputtering on a clear glass substrate 1 so as to have approximately the layer stack set forth below. This example is according to an example embodiment of this invention as shown in FIG. 3. The thicknesses are in units of angstroms (Å) and are approximations.

| Layer<br>Glass Substrate | Example 1 |
|---|---|
| $Si_xN_y$ | 186 |
| ZnAlO | 107 |
| Ag | 107 |
| $NiCrO_x$ | 30 |
| $SnO_2$ | 260 |
| ZnSnO | 260 |
| $Si_xN_y$ | 131 |
| ZnO | 119 |
| Ag | 103 |
| $NiCrO_x$ | 33 |
| $SnO_2$ | 120 |
| $Si_3N_4$ | 320 |

After being sputter deposited onto the glass substrates, the Example coated article was heat treated in a manner sufficient for tempering and bending, and had the optical characteristics set forth in the optical tables above. Moreover, heat bending of the coated article with the structure of this Example shown in FIGS. 2-3 to a centerline convex value "x" of 30 mm did not result in any significant mottling damage. For purposes of comparison, a similar coated article except without the zinc stannate layer suffered fatal mottling damage once the bending reached a centerline convex value "x" of about 22-23 mm. Thus, is can be seen that the provision of the layer stack according to certain example embodiments of this invention, with the zinc stannate based layer 14 in between the tin oxide based layer 13 and silicon nitride based layer 15, unexpectedly and significantly improved the bendability of the coated article and reduced mottling damage.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A bent vehicle windshield comprising first and second bent glass substrates, the first bent substrate supporting a coating thereon, the coating comprising:
   a first dielectric layer supported by the first bent glass substrate;
   a first infrared (IR) reflecting layer supported by the first bent glass substrate and located over at least the first dielectric layer;
   a first layer comprising tin oxide located over at least the first IR reflecting layer and the first dielectric layer;
   a first layer comprising zinc stannate located over and contacting the first layer comprising tin oxide;
   a layer comprising silicon nitride located over at least the first layer comprising zinc stannate;
   a second IR reflecting layer located over at least the layer comprising silicon nitride; and
   at least another dielectric layer located over at least the second IR reflecting layer.

2. The windshield of claim 1, further comprising a layer comprising zinc oxide located under and contacting the second IR reflecting layer, and wherein the layer comprising zinc oxide is over and contacting the layer comprising silicon nitride.

3. The windshield of claim 1, further comprising an overcoat layer of zirconium oxide.

4. The windshield of claim 1, wherein the layer comprising silicon nitride directly contacts the layer comprising zinc stannate.

5. The windshield of claim 1, wherein the windshield is bent to a degree sufficient so as to have a centerline convex value "x" of at least about 26 mm, and is substantially free of mottling.

6. The windshield of claim 1, wherein the windshield is bent to a degree sufficient so as to have a centerline convex value "x" of at least about 28 mm, and is substantially free of mottling.

7. The windshield of claim 1, wherein the windshield is bent to a degree sufficient so as to have a centerline convex value "x" of at least about 30 mm, and is substantially free of mottling.

8. A coated article comprising a coating supported by a glass substrate, the coating comprising from the glass substrate, the coating comprising from the glass substrate outwardly:
   a layer comprising silicon nitride;
   a first layer comprising zinc oxide located over and contacting the layer comprising silicon nitride;
   a first infrared (IR) reflecting layer located over and contacting the layer comprising zinc oxide;
   a layer comprising tin oxide located over the first IR reflecting layer;
   a layer comprising zinc stannate located over the layer comprising tin oxide;
   a layer comprising silicon nitride located over the layer comprising zinc stannate;
   a second IR reflecting layer located over the layer comprising silicon nitride; and
   at least another dielectric layer located over the second IR reflecting layer.

9. The coated article of claim 8, wherein the coated article is heat treated and is bent to a degree sufficient so as to have a centerline convex value "x" of at least about 26 mm.

10. The coated article of claim 8, wherein the coated article is heat treated and is bent to a degree sufficient so as to have a centerline convex value "x" of at least about 28 mm and is substantially free of mottling.

* * * * *